United States Patent
Withrow et al.

(10) Patent No.: US 11,442,203 B2
(45) Date of Patent: Sep. 13, 2022

(54) GRADIENT-INDEX LENS FOR APERTURE-CONSTRAINED ARRAYS AND SYSTEM, APPARATUS, AND METHOD THEREOF

(71) Applicant: Lockheed Martin Corporation, Bethesda, MD (US)

(72) Inventors: Joshua W. Withrow, Liverpool, NY (US); John P. Barrett, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 363 days.

(21) Appl. No.: 16/846,083

(22) Filed: Apr. 10, 2020

(65) Prior Publication Data
US 2021/0318470 A1    Oct. 14, 2021

(51) Int. Cl.
*G02B 3/00* (2006.01)
*G01S 13/90* (2006.01)

(52) U.S. Cl.
CPC ............ *G02B 3/0087* (2013.01); *G01S 13/90* (2013.01)

(58) Field of Classification Search
CPC .............................. G02B 3/0087; G01S 13/90
See application file for complete search history.

(56) References Cited

U.S. PATENT DOCUMENTS

2019/0086581 A1 * 3/2019 Diehl ................... G02B 3/0087

OTHER PUBLICATIONS

Aziz, Rao Shahid "EM lens design using thin planar metasurfaces for high antenna gain and low SLL applications," The Institution of Engineering and Technology, *IET Microw. Antennas Propag.*, 2019, vol. 13 Iss 7, pp. 950-958.
Teichman, Jeremy et al., "Gradient Index Optics at DARPA," Institute for Defense Analyses, IDA Document D-5027 Nov. 2013.
Zhangs, S. et al., 2016. "3D-printed planar graded index lenses" IET Microwaves, Antennas & Propagation, 10 (13), pp. 1411-1419. Loughborough University Institutional Repository.
Frid, Henrik et al. "Optimization of Micromachined Millimeter-Wave Planar Silicon Lens Antennas with Concentric and Shifted Matching Regions," Progress in Electromagnetics Research C, vol. 79, 17-29, 2017.
Pourahmadazar, Javad et al. "Towards Millimeter-wavelength: Transmission-Mode Fresnel-Zone Plate Lens Antennas using Plastic Material Porosity Control in Homogeneous Medium," Mar. 28, 2018, 8:5300 | DOI:10.1038/S41598-018-23179-8.
Zhang, Shiyu et al. "3D-printed planar graded index lenses," The Institution of Engineering and Technology, IET Microw Antennas Propag. 2016, vol. 10, Iss. 13, pp. 1411-1419.

* cited by examiner

*Primary Examiner* — Sung H Pak
*Assistant Examiner* — Hoang Q Tran
(74) *Attorney, Agent, or Firm* — Michael Best & Friedrich LLP (57) ABSTRACT

A gradient-index (GRIN) lens comprises an input surface defined by a body configured to receive electromagnetic (EM) waves from an aperture-constrained array; and an output surface defined by the body configured to output phase-aligned EM waves based on the received EM waves from the aperture-constrained array. The GRIN lens can be dimension-constrained in at least one dimension and can have a non-linear permittivity taper in at least a first dimension. The GRIN lens can provide gain for the received EM waves from the aperture-constrained array.

20 Claims, 7 Drawing Sheets

GRADIENT-INDEX LENS FOR APERTURE-CONSTRAINED ARRAYS AND SYSTEM, APPARATUS, AND METHOD THEREOF

SUMMARY

Embodiments of the disclosed subject matter involve a gradient-index (GRIN) lens and systems, assemblies, and methods thereof, including a GRIN lens implemented with an aperture-constrained sensor system.

According to one or more embodiments of the disclosed subject matter, a gradient-index (GRIN) lens for a radar sensor can be provided or implemented. The GRIN lens can comprise an input surface defined by a body configured to receive and transmit electromagnetic (EM) waves from an aperture-constrained phased array; and an output surface defined by the body configured to output phase-aligned EM waves based on the EM waves transmitted from the input side of the GRIN lens. The GRIN lens can be dimension-constrained in at least one dimension, the GRIN lens can have a first multi-extrema permittivity taper in a first dimension, the GRIN lens can be planar or conformal, and/or the GRIN lens can be comprised of a plurality of unit cells configured to provide the first multi-extrema permittivity taper based on relative configuration of a first material and a second material different from the first material.

Additionally, one or more embodiments of the disclosed subject matter can provide or implement an aperture-constrained radar system. The aperture-constrained radar system can comprise an electronically scanned aperture-constrained phased array configured to output directive electromagnetic (EM) waves according to a first gain; and a gradient-index (GRIN) lens provided in front of and aligned with the electronically scanned aperture-constrained phased array to receive the directive EM waves output from the electronically scanned aperture-constrained phased array and output phase-aligned EM waves according to a second gain greater than the first gain, wherein the GRIN lens is spaced from the electronically scanned aperture-constrained phased array by a predetermined electrical distance, wherein air as a transmission medium is provided between the electronically scanned aperture-constrained phased array and an input side of the GRIN lens and at an output side of the GRIN lens, wherein the electronically scanned aperture-constrained phased array is aperture-constrained in one, some, or all of an elevation dimension, an azimuthal dimension, and a direction of radiation dimension, wherein the GRIN lens is no greater in dimension than either the azimuthal dimension or the elevation dimension and is greater in dimension than an overall area of the electronically scanned aperture-constrained phased array by no more than 10%, and wherein the GRIN lens has a multi-extrema permittivity taper in the aperture-constrained one or more of the elevation dimension, the azimuthal dimension, and the direction of radiation dimension.

One or more embodiments of the disclosed subject matter can also provide or implement an aperture-constrained phased array assembly. The aperture-constrained phased array assembly can comprise an aperture-constrained phased array configured to output electromagnetic (EM) waves; and a gradient-index (GRIN) lens provided in front of and aligned with the aperture-constrained phased array to output phase-aligned EM waves based on the EM waves output from the aperture-constrained phased array. The GRIN lens can be spaced from the aperture-constrained phased array by a predetermined electrical distance, the aperture-constrained phased array can be aperture-constrained, the GRIN lens can be no more than 10% greater in overall height and width than the aperture-constrained phased array, and/or the GRIN lens can have a permittivity taper in a first dimension.

Embodiments can also include methods of providing, making, and/or using apparatuses and systems, or portions thereof, according to one or more embodiments of the disclosed subject matter. Further, methods (e.g., electronically scanning) according to one or more embodiments of the disclosed subject matter may be computer-implemented methods in whole or in part, for instance, via a non-transitory computer-readable storage medium storing computer-readable instructions that, when executed by a computer, cause the computer to perform a method.

The preceding summary is to provide an understanding of some aspects of the disclosure. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings, which are incorporated in and constitute a part of the specification, are illustrative of one or more embodiments of the disclosed subject matter, and, together with the description, explain various embodiments of the disclosed subject matter. Further, the accompanying drawings have not necessarily been drawn to scale, and any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more" or "at least one." The phrases "at least one," "one or more," "or," and "and/or" are open-ended expressions that can be both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" can mean A alone, B alone, C alone, A and B together, A and C together, B and C together, or A, B and C together. It is also to be noted that the terms "comprising," "including," and "having" can be used interchangeably.

It is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Control aspects of the present disclosure (e.g., pertaining to electronic scanning) may take the form of an entirely hardware embodiment, an entirely software embodiment (including firmware, resident software, micro-code, etc.) or an embodiment combining software and hardware aspects that may all generally be referred to herein as a "circuit," "circuitry," "module" or "system." Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, device, or portion thereof.

Range of a sensor (e.g., a radar) can be determined based on the amount of power transmitted into free space and the gain of an aperture thereof. An increase in transmit power can lead to a larger heat load and power requirement for the sensor.

As noted above, embodiments of the disclosed subject matter can involve or be directed to a gradient-index (GRIN) lens and systems, assemblies, and methods thereof. Enhanced gain can be realized (e.g., as compared to without the GRIN lens) according to embodiments of the disclosed subject matter without or without significantly increasing overall aperture array size in at least one of the x- and y-dimensions (e.g., in the elevation dimension). The GRIN lens, according to one or more embodiments, may be only slightly larger in x- and/or y-dimensions as compared to an aperture-constrained array paired with the GRIN lens. Such enhanced gain can also be provided without or without significantly increasing heat and/or power requirements for the sensor. Thus, embodiments of the disclosed subject matter can provide a sensor with increased range without or without significantly increasing size of the sensor (at least in one dimension) and/or without or without significantly increasing heat and/or power requirements for the sensor.

Figure 1:
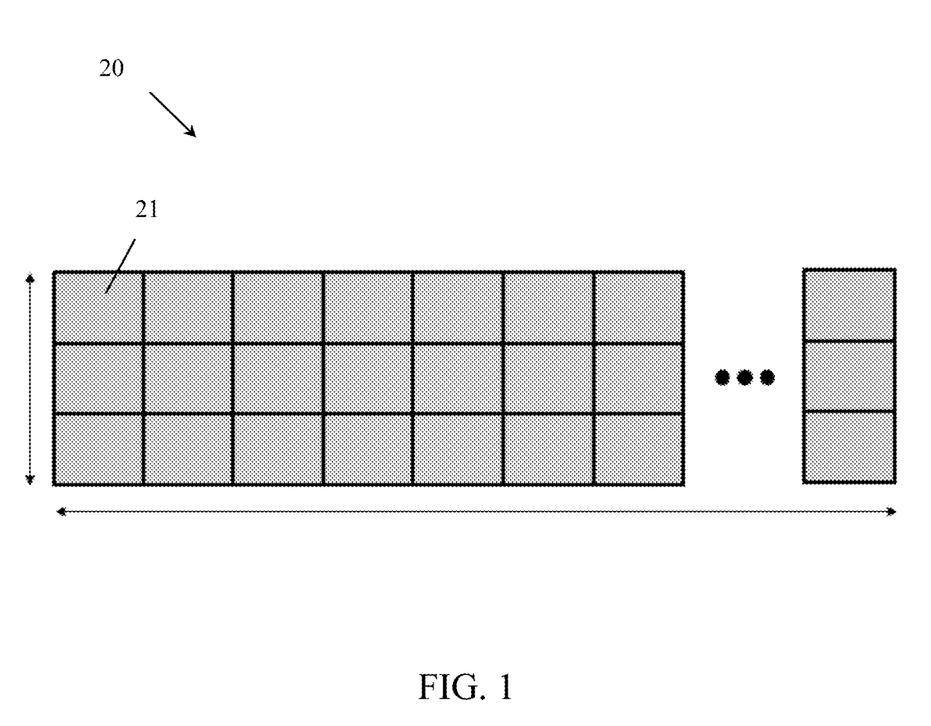
FIG. 1 is a diagrammatic representation of an aperture-constrained array according to one or more embodiments of the disclosed subject matter.

Turning to the figures, FIG. 1 is a diagrammatic representation of an antenna or array 20 according to one or more embodiments of the disclosed subject matter. The array 20, which can include a plurality of rows and columns of apertures 21, can be representative of a phased array (e.g., electronically scanned). Furthermore, the array 20, according to one or more embodiments, can be representative of an array that is aperture-constrained in one or more dimensions, including in the x-dimension (or azimuth or width), the y-dimension (or vertical or height), and/or the z-dimension (or direction of radiation). In general, an aperture-constrained dimension can be a dimension of the antenna or array 20 that cannot be increased in size due to volumetric constraints imposed on the array 20 by a platform thereof, such as the leading edge of a wing, a radome, etc. Thus, such aperture-constrained arrays 20 may be implemented in size-constrained applications, such as radars for airborne applications (e.g., the leading edge of a wing with constrained height) or ground-based electronic warfare (EW) applications.

As shown in FIG. 1, the array 20 can be aperture-constrained in one dimension. In this example, the aperture-constrained dimension is in the y- or height-dimension, though embodiments of the disclosed subject matter are not so limited. The x- or width-dimension may be viewed as a non-aperture-constrained dimension, meaning that the number of apertures 21 and/or the length of the array 20 in this dimension may not be particularly limited and/or the number of apertures 21 is greater by a certain factor (e.g., at least 2-times or at least 3-times) the number of apertures 21 in the aperture-constrained dimension. Optionally, each of the apertures 21 may be relatively electrically small (e.g., only a few wavelengths in height and/or width). Hence, in the aperture-constrained dimension the array 20 may also be relatively electrically small based on the relatively small amount of apertures 21, particularly as compared to the relatively electrically large non-aperture-constrained dimension based on the relatively large amount of apertures 21.

Figure 2:
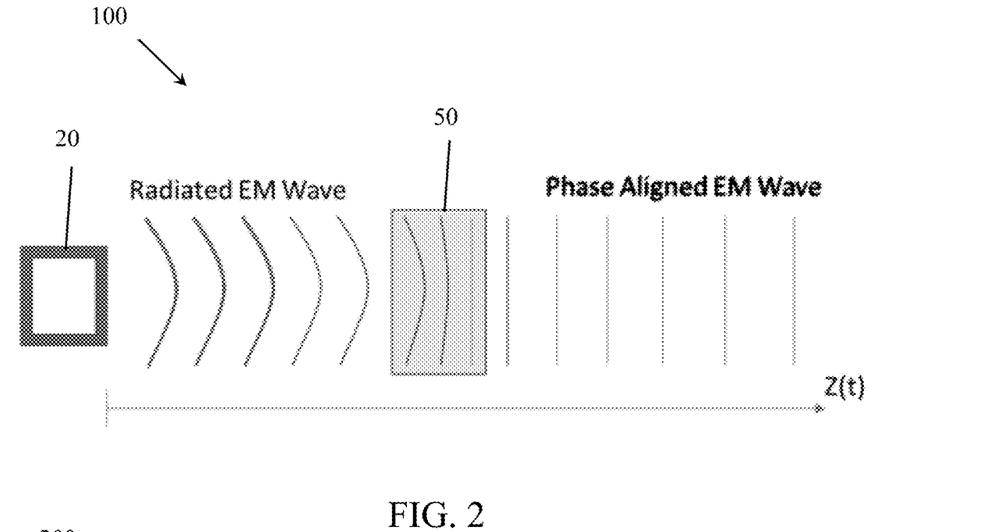
FIG. 2 is a diagrammatic representation of a system or assembly according to embodiments of the disclosed subject matter.

FIG. 2 is a diagrammatic representation of a system or assembly 100 according to embodiments of the disclosed subject matter.

The system 100 can include an array or antenna, such as array 20, and a gradient-index (GRIN) lens 50 provided in front of the array 20. The array 20, which can be planar or conformal, can be an electronically scanned aperture-constrained phased array, as noted above. Though lens 50, which can be planar or conformal, is shown in rectangular form, embodiments of the disclosed subject matter are not so limited, and, therefore, the lens 50 may be in the form of other three-dimensional shapes, such as concave at one or both input and output sides, convex at one or both input and output sides, non-linear and one or both input and output sides, etc.

The system 100, particularly the array 20, can output electromagnetic (EM) waves directed toward the lens 50, and the lens 50 can output phase-aligned EM waves, such as diagrammatically shown, based on the spatially varying refractive index of the lens 50 slowing down the phase center of the EM waves. Generally, the EM waves output by the array 20 can be according to a first gain provided by the array 20, and the EM waves output from the lens 50 can be according to a second gain greater than the first gain. According to one or more embodiments, the second gain can be greater than 0 dB greater than the first gain (e.g., greater than 0 dB greater to 2.61 dB greater) or at least 2.3 dB greater (e.g., 2.3 dB-2.61 dB greater) than the first gain. According to one or more embodiments, the EM waves output by the array 20 can have a wavelength from UHF ($\lambda$=39.37") through S-band ($\lambda$=3.15") inclusive or from UHF ($\lambda$=39.37") through X-band ($\lambda$=0.98").

Figure 3:
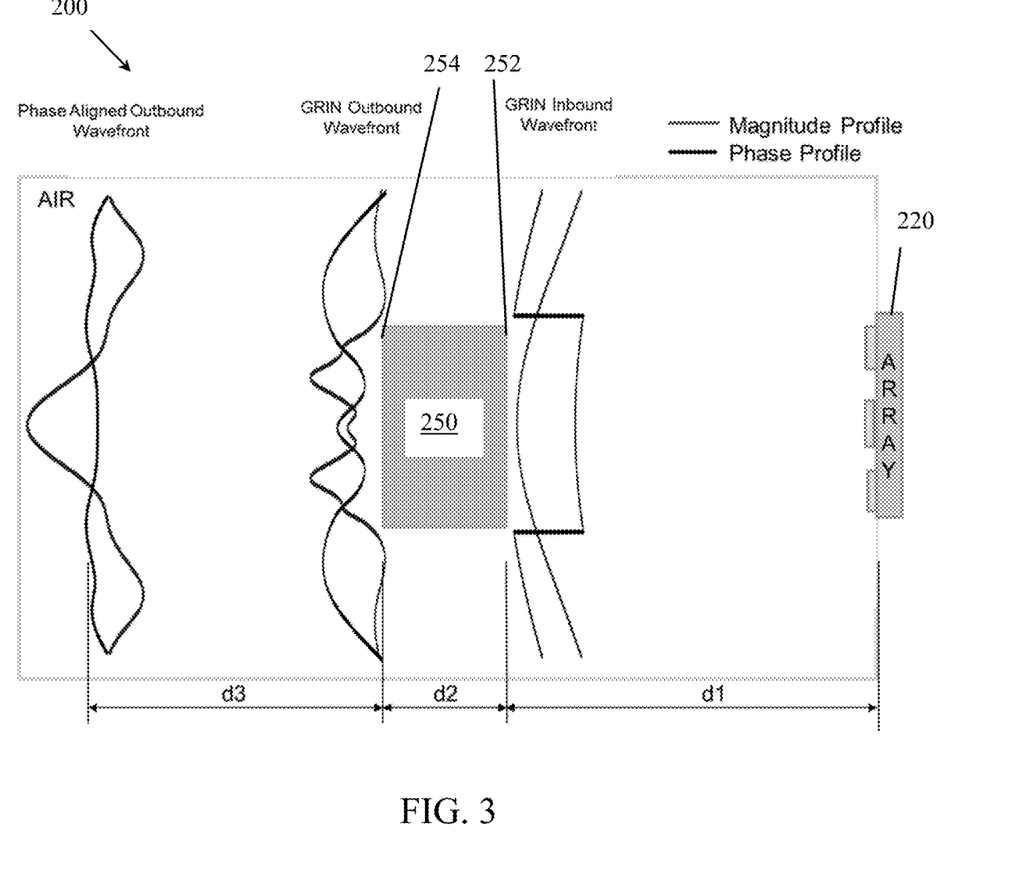
FIG. 3 is a block diagram of a system or assembly according to embodiments of the disclosed subject matter.

Turning to FIG. 3, FIG. 3 is a block diagram of a system or assembly 200 according to embodiments of the disclosed subject matter. The system 200 is similar to system 100 discussed above, but shows a specific dimension for the array 220. As shown in FIG. 3, the gradient-index (GRIN) lens 250 can be aligned with the array 220 such that electromagnetic waves (EM) waves output from the array 220 can be received at an input side 252 of the lens 250, transmitted to the output side 254 thereof, and output from the lens 250 at the output side 254 thereof.

The array 220 can be aperture-constrained in one or more dimensions. For instance, the array 220 can be constrained in the y- or height-dimension (i.e., only three apertures in the height dimension). Of course, embodiments of the disclosed subject matter are not limited and may alternatively or additionally be constrained in the x- and/or z-dimensions. Optionally, the array 220 may not be aperture-constrained in at least one dimension, such as the x- and/or z-dimension.

FIG. 3 also shows that the lens 250 can be a predetermined electrical distance d1 away from the output of the array 220. According to one or more embodiments, the predetermined electrical distance d1 can be according to a Fresnel region of the array 220, for instance, between $\lambda/\pi$ and $(2*(\text{array height})^2)/\lambda$, where $\lambda$ is wavelength of the EM waves output by the array 220. Thus, according to one or more embodiments, the lens 250 can be placed according to the predetermined electrical distance d1 so as to be close enough to the array 220 to capture and redirect a sufficient amount of radiated energy, but not so close as to occupy the array's reactive near field and affect the characteristic impedance of the output of the array 220.

According to embodiments of the disclosed subject matter, the lens 250 can have x- and/or y-dimensions similar to the x- and y-dimensions of the array 220. For example, the lens 250, according to one or more embodiments, may be greater in overall x- and y-dimension by no more than by 10%. This can mean that one or both of the x- and y-dimensions can be greater than respective x- and y-dimensions of the array 220 by no more than by 10%. Or, alternatively, only one of the x- and y-dimensions may be greater than respective x- and y-dimensions of the array 220 by no more than by 10%. Optionally, the greater dimension for the lens 250 can be a non-aperture constrained dimension of the x- and y-dimensions, with the lens 250 and array 220 being the same value in the aperture-constrained dimension of the x- and y-dimensions.

The lens 250 may have an electrical thickness or define an electrical distance d2 from the input side 252 to the output side 254. Such electrical distance d2 can be less than $\lambda/2$, where $\lambda$ is wavelength of the EM waves output by the array 220.

The lens 250 can also be surrounded or substantially surrounded (e.g., excluding support structure) by air (e.g., $\varepsilon_r$=1) as a transmission medium for the EM waves. Thus, air can be provided between the output of the array 220 and the input side of the lens 250 and at the output side of the lens 250. Optionally, air can be provided at the top, the bottom, and/or sides of the lens 250.

The lens 250 can have a permittivity taper in one or more dimensions. According to one or more embodiments, the permittivity taper can be non-linear. For example, each permittivity taper can be a multi-extrema permittivity taper.

The distance d3 in FIG. 3 can generally refer to an electrical distance result of the system and not necessarily a parameter of the system 200. For example, the distance d3 can represent an electrical distance whereby all wavelets from the output of the lens 250 are aligned.

Generally speaking, the lens 250 with the permittivity taper and surrounding air can control wavefronts of the EM waves received from the array 220 to output phase-aligned EM waves with a more directive wavefront pattern.

Figure 4A:
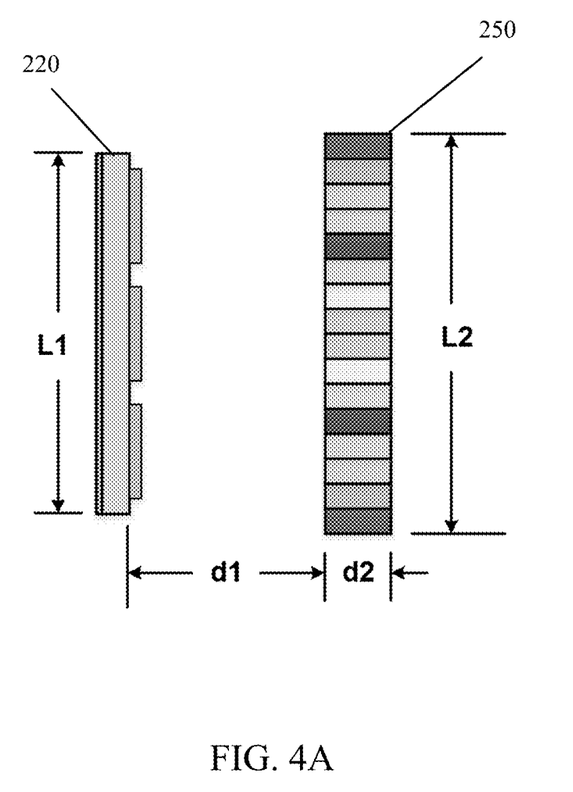
FIG. 4A is a diagrammatic representation of an aperture-constrained array and gradient-index (GRIN) lens according to one or more embodiments of the disclosed subject matter.
Figure 4B:
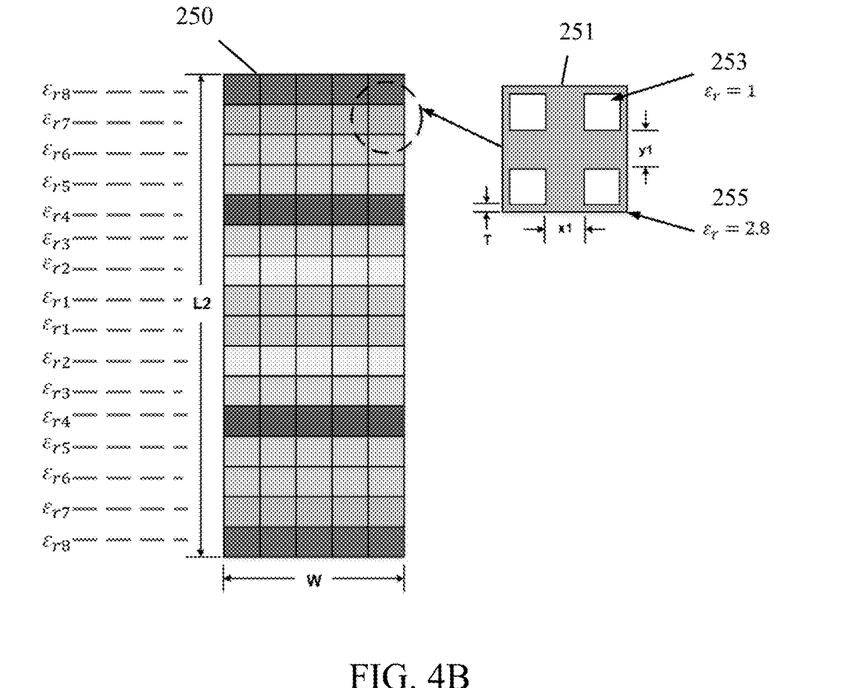
FIG. 4B is a diagrammatic representation of the GRIN lens of FIG. 4A.
Figure 4C:
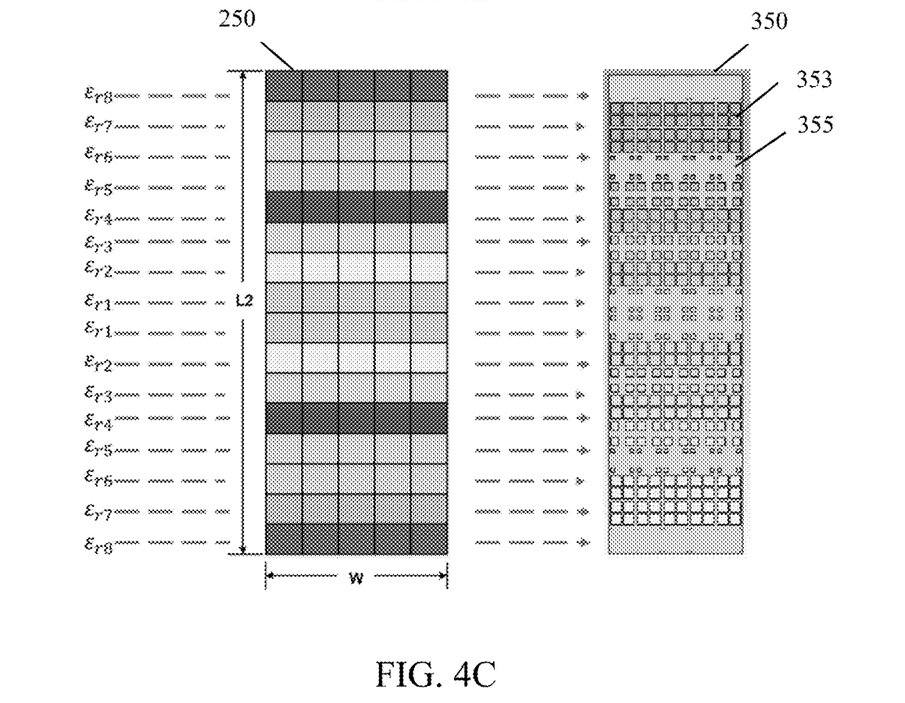
FIG. 4C shows the diagrammatic representation of the GRIN lens of FIG. 4A in correspondence with an exemplary GRIN lens according to one or more embodiments of the disclosed subject matter.

FIGS. 4A-4C show diagrammatic representations of array 220 and lens 250, which, in this example, can be aperture-constrained and dimension-constrained, respectively, in the y- or vertical direction and the z- or radiation-direction-dimension. Optionally, the array 220 and lens 250 may be characterized as non-aperture-constrained and non-dimension-constrained in the x- or width-dimension (i.e., into and out of the page in the view of FIG. 4A). In this example, height L2 of the lens 250 can be slightly greater than the height L1 of the array 220. For example, as noted above, the height L2 may be no more than 10% greater than the height L1.

As can be seen from FIG. 4B, the lens 250 can have a permittivity taper, i.e., different values of permittivity, $\varepsilon$, in a particular dimension, in this case, the y-dimension. FIGS. 4A-4C, for instance, show permittivity taper according to permittivity values $\varepsilon_r 8 - \varepsilon_r 1$. Though the permittivity values $\varepsilon$ in FIGS. 4B and 4C are numbered in order, the permittivity taper according to embodiments of the disclosed subject matter can be non-linear, for instance, according to a multi-extrema permittivity taper.

According to one or more embodiments, the permittivity taper can be provided only in association with the aperture-constrained dimension of the array 220. FIGS. 4A-4C, for instance, provide the permittivity taper in the y- or height-dimension. The permittivity of the lens units 251 in the other dimensions, i.e., the x- or width-dimension and z- or radiation-direction-dimension, may not be subject to a gradient or taper. Such arrangement can leave the scanning ability for the unconstrained dimension unaffected. Such arrangement can also allow the lens 250 to be applied to both planar apertures and conformal apertures (e.g., a cylindrical array in the leading edge of a wing), the latter of which may require scanning in the unconstrained dimension at all times. Optionally, the x- or width-dimension (i.e., into and out of the page in the view of FIG. 4A) can be aperture- and dimension-constrained, for instance, if the platform's volumetric constraints so dictate, which can mean that if such dimension of the array 220 is constrained to a relative small number of wavelengths (e.g., a couple) of the transmit/received wave, than a permittivity gradient can be provided in the x- or width-dimension.

Thus, the permittivity taper can be provided in association with one or more dimensions of the array 220.

Figure 5:
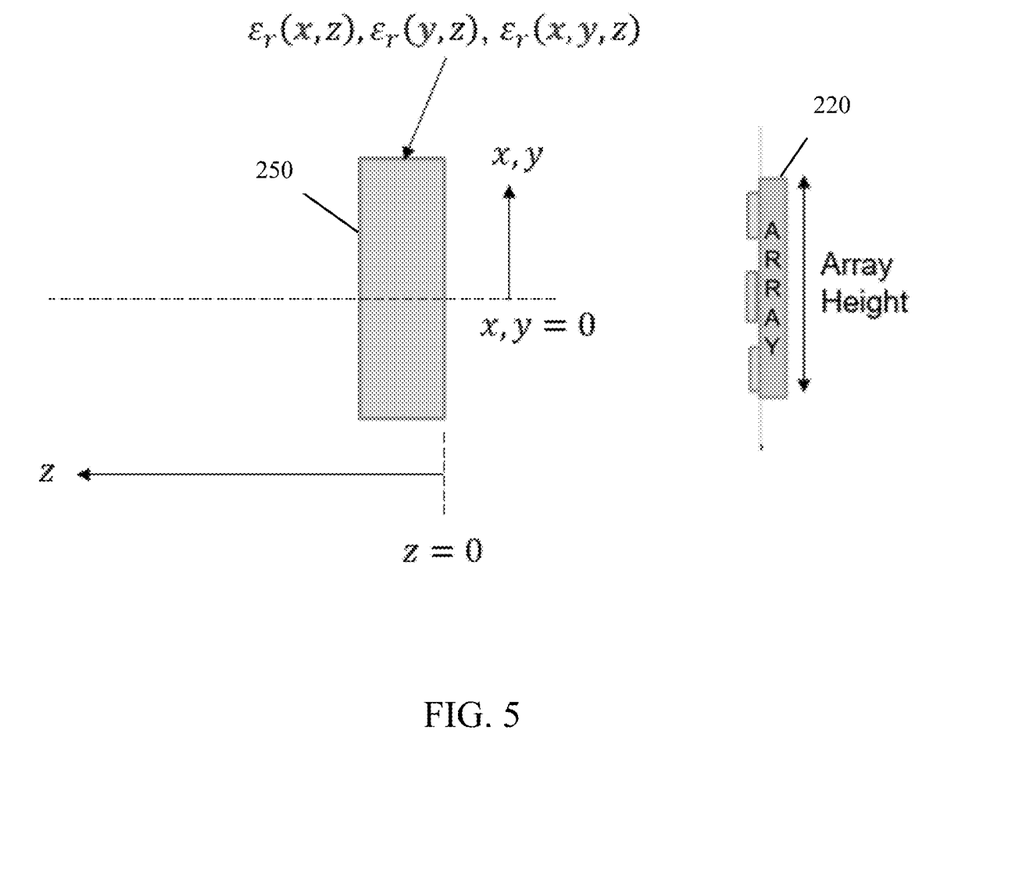
FIG. 5 is a diagrammatic representation of a gradient-index (GRIN) lens having tapering permittivity and aperture-constrained array according to one or more embodiments of the disclosed subject matter.

FIG. 5, for instance, illustrates where permittivity taper can be provided in one or more of the x-, y-, and z-dimensions. For instance, providing a permittivity gradient or taper in the x-dimension and the y-dimension can permit off-axis electrical scanning in either dimension, for instance, based on the geometry of the lens 250 and phase correction of the wavefront output by the array 220 prior to reaching the lens 250. As another example, a permittivity gradient or taper in the z-dimension can provide impedance matching to the array 220, impedance matching to particular media (e.g., air, water, radome material), and/or lens shape independence, i.e., the freedom to match the array-side wavefront to the geometry of the lens 250. That is, if the distance dl is relatively small, i.e., the aperture is constrained in the z- or radiating-dimension such that the lens 250 modifies the characteristic impedance of the output of the array 220, then a gradient can be placed in the z-dimension of the lens 250 in order to match the characteristic impedance of the lens 250 to the array 220 in order to minimize reflections and maximize realized gain, for instance. In the case of permittivity taper in multiple dimensions, according to one or more embodiments, the gradient or taper can be different for the different dimensions.

Turning back to FIGS. 4A-4C, FIG. 4B shows an enlarged view of an exemplary lens unit 251 according to embodiments of the disclosed subject matter. The lens units 251 can provide the permittivity taper or gradient based on relative configuration of a first material and a second material different from the first material, which can have different permittivities and/or dielectric constants. According to one or more embodiments, the first material can be air and the second material can be a plastic, and the permittivity taper or gradient can be provided by volumetric averaging the air and plastic. For example, the enlarged lens unit 251 of FIG. 4B can include a plurality of air pockets 253 (e.g., $\varepsilon_r=1$) set in a body made of plastic 255 (e.g., a thermoplastic such as ABS plastic) (e.g., $\varepsilon_r=2.8$). The dimensions x1, y1, and T represent dimensions of the lens unit 251 according to embodiments of the disclosed subject matter. Such dimensions may be modified or set to effectively average a particular amount of air into any base material, such as plastic. For example, the smaller the values for x1, y1, and T are set the closer the effective dielectric constant of the lens unit 251 is to that of air. As another example, the lens unit 251 can be made of layers of compatible material with different dielectric constants, such as alumina for the first material and $MgCaTiO_4$ for the second material.

FIG. 4C shows a practical implementation of the lens 250 in the form of gradient-index (GRIN) lens 350. Notably, lens 350 can implement the permittivity taper or gradient of lens 250 by incorporating by volumetric averaging air pockets 353 and plastic 355, for instance, on a per-lens unit basis. As noted above, the permittivity taper, which can be non-linear (e.g., multi-extrema) can be in one or more dimensions. The lens 350 of FIG. 4C can implement the permittivity taper in the y- or height-dimension.

Figure 6:
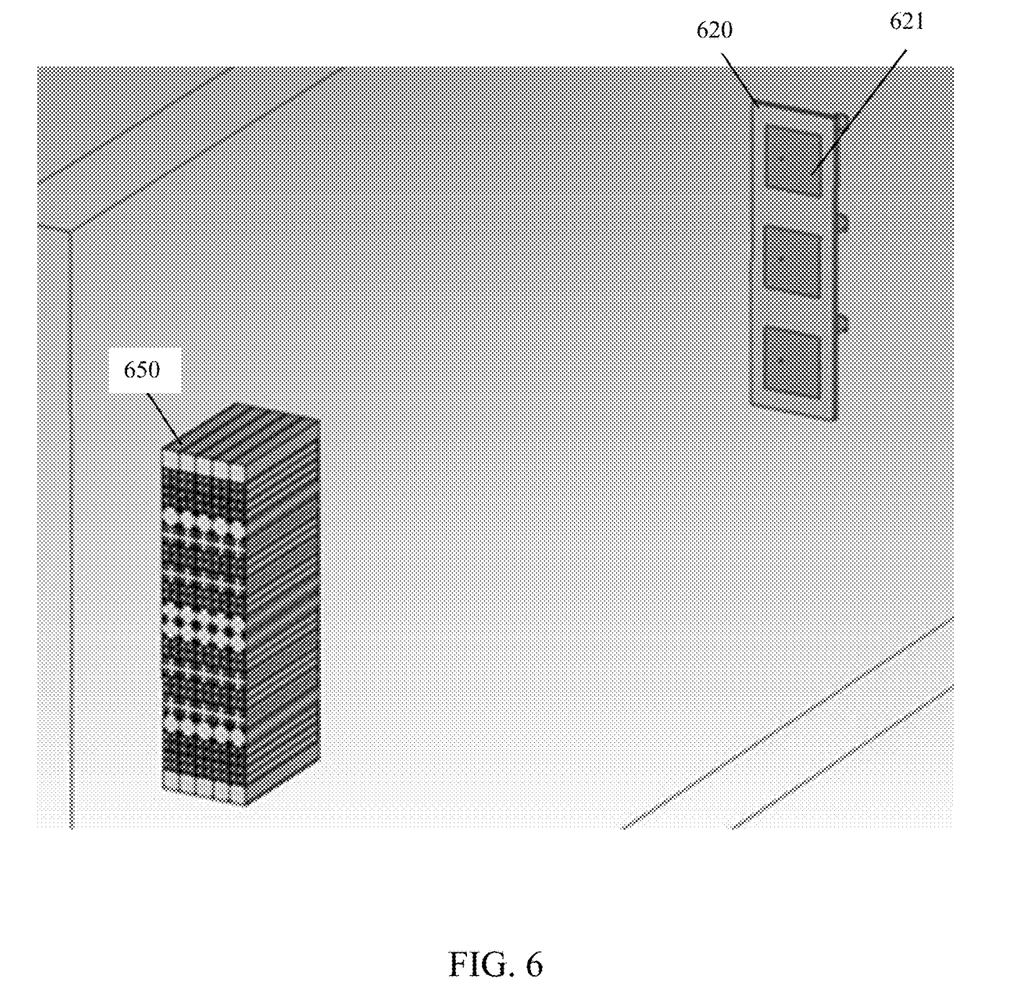
FIG. 6 shows an aperture-constrained array and gradient-index (GRIN) lens according to one or more embodiments of the disclosed subject matter.

FIG. 6 shows an array 620 and gradient-index (GRIN) lens 650 according to one or more embodiments of the disclosed subject matter. Notably, the array 620 and the lens 650 can be constrained in the same dimension. That is, the array 620 can be constrained in the number of apertures 621 in the x- or width-dimension, along with physical dimension constraint of the lens 650 in the x- or width dimension. The lens 650 can also be at or about the same size as the array 620 in the y- or height dimension. According to one or more embodiments, the lens 650 may be slightly larger in x-dimension and/or y-dimension than the array 620. For example, the lens 650 may be no greater than 10% in x-dimension and/or y-dimension than the array 620. The lens 650 can have a permittivity taper or gradient in one or more dimensions as discussed above, such as only the y- or height-dimension. As a non-limiting example, the slabs or rows of lens units can have x/y values as follows: (1) 0.060"; (2) 0.140"; (3) 0.100"; (4) 0.140"; (5) 0.100"; (6) 0.050"; (7) 0.135"; (8) 0.140"; (9) 0.005".

Figure 7:
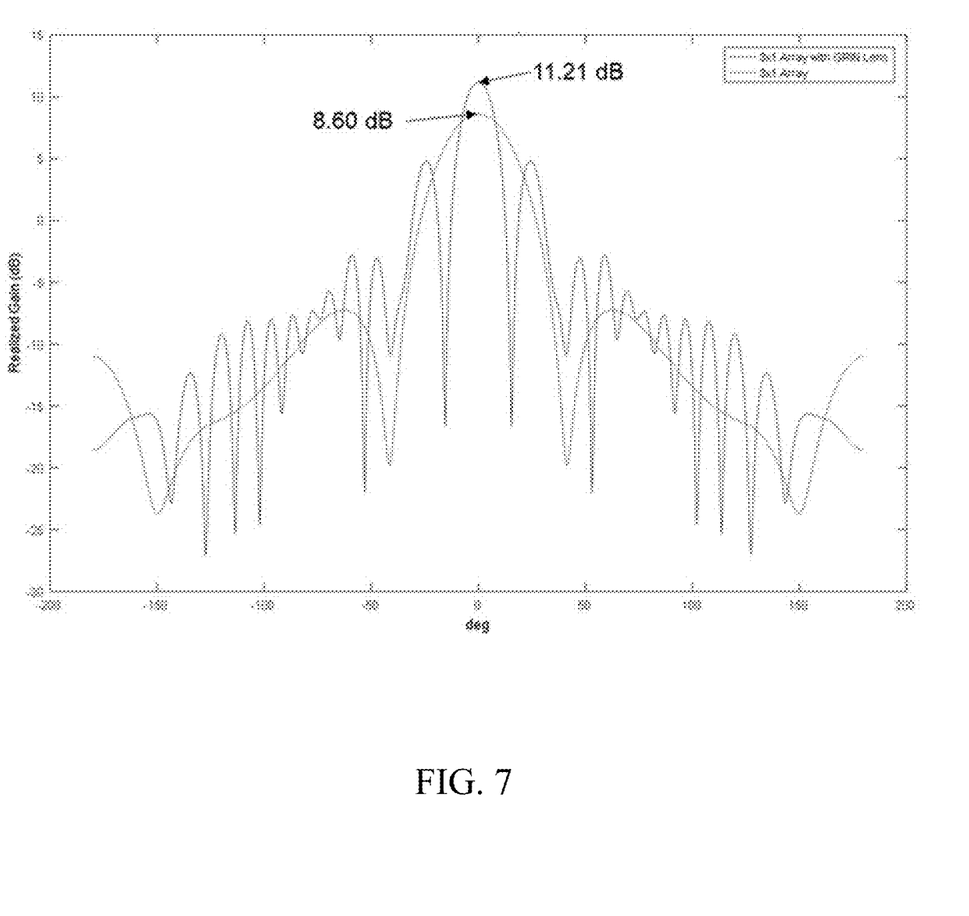
FIG. 7 is a graph showing exemplary gain characteristics according to one or more embodiments of the disclosed subject matter.

FIG. 7 is a graph showing exemplary gain characteristics according to one or more embodiments of the disclosed subject matter.

Gradient-index (GRIN) lenses according to embodiments of the disclosed subject matter can realize a multiple dB gain enhancement compared to an aperture-constrained array without such GRIN lens. For example, embodiments of the disclosed subject matter can realize a gain enhancement between 2.3 dB-2.61 dB. FIG. 7 shows a realized gain enhancement of 2.61 dB when implemented with a 3×1 S-band line array, as a non-limiting example. Such non-limiting example may be representative of implementation of lens 650 and array 620 from FIG. 6.

Embodiments of the disclosed subject matter may also be as set forth according to the parentheticals in the following paragraphs.

(1) An aperture-constrained radar system comprising: an electronically scanned aperture-constrained phased array configured to output directive electromagnetic (EM) waves according to a first gain; and a gradient-index (GRIN) lens provided in front of and aligned with the electronically scanned aperture-constrained phased array to receive the directive EM waves output from the electronically scanned aperture-constrained phased array and output phase-aligned EM waves according to a second gain greater than the first gain, wherein the GRIN lens is spaced from the electronically scanned aperture-constrained phased array by a predetermined electrical distance, wherein air as a transmission medium is provided between the electronically scanned aperture-constrained phased array and an input side of the GRIN lens and at an output side of the GRIN lens, wherein the electronically scanned aperture-constrained phased array is aperture-constrained in a first dimension and is non-aperture-constrained in a second dimension, wherein the GRIN lens is no greater in dimension than the aperture-constrained first dimension and is greater in dimension than the non-aperture-constrained second dimension by no more than 10%, and wherein the GRIN lens has a multi-extrema permittivity taper in at least the aperture-constrained first dimension.

(2) The aperture-constrained radar system according to (1), wherein the predetermined electrical distance by which the GRIN lens is spaced from the electronically scanned aperture-constrained phased array is between $\lambda/\pi$ and $(2*$ (array height)$^2)/\lambda$, and/or an electrical thickness of the GRIN lens is less than $\lambda/2$, where $\lambda$ is wavelength of the directive EM waves output by the electronically scanned aperture-constrained phased array.

(3) The aperture-constrained radar system according to (1) or (2), wherein the GRIN lens is planar or conformal.

(4) The aperture-constrained radar system according to any one of (1) to (3), wherein the second gain is 2.3 dB-2.61 dB greater than the first gain.

(5) The aperture-constrained radar system according to any one of (1) to (4), wherein the directive EM waves output by the electronically scanned aperture-constrained phased array have a wavelength from UHF through S-band inclusive.

(6) The aperture-constrained radar system according to any one of (1) to (5), wherein the GRIN lens is comprised of a plurality of windowed unit cells configured to provide the multi-extrema permittivity taper based on relative configuration of a first material and a second material different from the first material.

(7) The aperture-constrained radar system according to any one of (1) to (6), wherein the first material is a thermoplastic polymer and the second material is air, and/or the first material has a first dielectric constant and the second material has a dielectric constant different from the first dielectric constant.

(8) The aperture-constrained radar system according to any one of (1) to (7), wherein each of the aperture-constrained first dimension of the GRIN lens and the non-aperture-constrained second dimension of the GRIN lens has the multi-extrema permittivity taper.

(9) The aperture-constrained radar system according to any one of (1) to (8), wherein the multi-extrema permittivity taper of the aperture-constrained first dimension is different from the multi-extrema permittivity taper of the non-aperture-constrained second dimension.

(10) The aperture-constrained radar system according to any one of (1) to (9), wherein the aperture-constrained first dimension is a z-dimension, the multi-extrema permittivity taper of the GRIN lens being in the z-dimension.

(11) The aperture-constrained radar system according to any one of (1) to (10), wherein the electronically scanned aperture-constrained phased array is aperture-constrained in the first dimension and is non-aperture-constrained in the second dimension such that the first dimension is defined by a first number of wavelengths and the second dimension is defined by a second number of wavelengths greater than the first number of wavelengths.

(12) An aperture-constrained phased array assembly comprising: an aperture-constrained phased array configured to output electromagnetic (EM) waves; and a gradient-index (GRIN) lens provided in front of and aligned with the aperture-constrained phased array to output phase-aligned EM waves based on the EM waves output from the aperture-constrained phased array, wherein the GRIN lens is spaced from the aperture-constrained phased array by a predetermined electrical distance, wherein the aperture-constrained phased array is aperture-constrained, wherein the GRIN lens is no more than 10% greater in overall height and width than the aperture-constrained phased array, and wherein the GRIN lens has a permittivity taper in a first dimension.

(13) The aperture-constrained phased array assembly according (12), wherein the permittivity taper is non-linear.

(14) The aperture-constrained phased array assembly according to (12) or (13), wherein the permittivity taper is a multi-extrema permittivity taper.

(15) The aperture-constrained phased array assembly according to any one of (12) to (14), wherein the aperture-constrained phased array is aperture-constrained in the first dimension.

(16) The aperture-constrained phased array assembly according to any one of (12) to (15), wherein the aperture-constrained phased array is aperture-constrained in an x-direction, a y-direction, and/or a z-direction.

(17) A gradient-index (GRIN) lens for a radar sensor comprising: an input surface defined by a body configured to receive electromagnetic (EM) waves from an aperture-constrained phased array; and an output surface defined by the body configured to output phase-aligned EM waves based on the received EM waves from the aperture-constrained phased array, wherein the GRIN lens is dimension-constrained in at least one dimension, wherein the GRIN lens has a first multi-extrema permittivity taper in a first dimension, wherein the GRIN lens is planar or conformal, and wherein the GRIN lens is comprised of a plurality of unit cells configured to provide the first multi-extrema permittivity taper based on relative configuration of a first material and a second material different from the first material.

(18) The gradient-index (GRIN) lens according to (17), wherein an electrical thickness of the GRIN lens is less than $\lambda/2$, where $\lambda$ is wavelength of the EM waves received from the aperture-constrained phased array.

(19) The gradient-index (GRIN) lens according to (17) or (18), wherein the GRIN lens has a second multi-extrema permittivity taper in a second dimension different from the first dimension.

(20) The gradient-index (GRIN) lens according to any one of (17) to (19), wherein the GRIN lens is no more than 10% greater in overall height and width than the aperture-constrained phased array.

(21) A method comprising: providing an aperture-constrained radar system according to any one of (1) to (11); and using the provided aperture-constrained radar system.

(22) A method comprising: providing an aperture-constrained phased array assembly according to any one of (12) to (16); and using the provided aperture-constrained phased array assembly.

(23) A method comprising: providing a gradient-index (GRIN) lens according to any one of (17) to (20).

Having now described embodiments of the disclosed subject matter, it should be apparent to those skilled in the art that the foregoing is merely illustrative and not limiting, having been presented by way of example only. Thus, although particular configurations have been discussed and illustrated herein, other configurations can be and are also employed. Further, numerous modifications and other embodiments (e.g., combinations, rearrangements, etc.) are enabled by the present disclosure and are contemplated as falling within the scope of the disclosed subject matter and any equivalents thereto. Features of the disclosed embodiments can be combined, rearranged, omitted, etc., within the scope of described subject matter to produce additional embodiments. Furthermore, certain features may sometimes be used to advantage without a corresponding use of other features. Accordingly, Applicant intends to embrace all such alternatives, modifications, equivalents, and variations that are within the spirit and scope of the present disclosure. Further, it is therefore to be understood that within the scope of the appended claims, the disclosure may be practiced otherwise than as specifically described herein.

What is claimed is:

1. An aperture-constrained radar system comprising:
an electronically scanned aperture-constrained phased array configured to output directive electromagnetic (EM) waves according to a first gain; and
a gradient-index (GRIN) lens provided in front of and aligned with the electronically scanned aperture-constrained phased array to receive the directive EM waves output from the electronically scanned aperture-constrained phased array and output phase-aligned EM waves according to a second gain greater than the first gain,
wherein the GRIN lens is spaced from the electronically scanned aperture-constrained phased array by a predetermined electrical distance,
wherein air as a transmission medium is provided between the electronically scanned aperture-constrained phased array and an input side of the GRIN lens and at an output side of the GRIN lens,
wherein the electronically scanned aperture-constrained phased array is aperture-constrained in one, some, or all of an elevation dimension, an azimuthal dimension, and a direction of radiation dimension,
wherein the GRIN lens is no greater in dimension than either the azimuthal dimension or the elevation dimension and is greater in dimension than an overall area of the electronically scanned aperture-constrained phased array by no more than 10%, and
wherein the GRIN lens has a multi-extrema permittivity taper in the aperture-constrained one or more of the elevation dimension, the azimuthal dimension, and the direction of radiation dimension.

2. The aperture-constrained radar system according to claim 1, wherein the predetermined electrical distance by which the GRIN lens is spaced from the electronically scanned aperture-constrained phased array is between $\lambda/\pi$ and $(2*(\text{array height})^2)/\lambda$, and/or an electrical thickness of the GRIN lens is less than $\lambda/2$, where $\lambda$ is wavelength of the directive EM waves output by the electronically scanned aperture-constrained phased array.

3. The aperture-constrained radar system according to claim 1, wherein the GRIN lens is planar or conformal.

4. The aperture-constrained radar system according to claim 1, wherein the second gain is greater than 0 dB greater than the first gain per aperture-constrained dimension.

5. The aperture-constrained radar system according to claim 1, wherein the directive EM waves output by the electronically scanned aperture-constrained phased array have a wavelength from UHF through X-band inclusive.

6. The aperture-constrained radar system according to claim 1, wherein the GRIN lens is comprised of a plurality of windowed unit cells configured to provide the multi-extrema permittivity taper based on relative configuration of a first material and a second material different from the first material.

7. The aperture-constrained radar system according to claim 6, wherein the first material is a thermoplastic polymer and the second material is air, and/or the first material has a first dielectric constant and the second material has a dielectric constant different from the first dielectric constant.

8. The aperture-constrained radar system according to claim 1, wherein at least two of the elevation dimension, the azimuthal dimension, and the direction of radiation dimension are aperture-constrained, the GRIN lens having the multi-extrema permittivity taper in each of the at least two aperture-constrained dimensions.

9. The aperture-constrained radar system according to claim 8, wherein the multi-extrema permittivity taper of at least one of the at least two aperture-constrained dimensions is different from the multi-extrema permittivity taper of another one of the at least two aperture-constrained dimensions.

10. The aperture-constrained radar system according to claim 1, wherein the electronically scanned aperture-constrained phased array is aperture-constrained in the direction of radiation dimension, the multi-extrema permittivity taper of the GRIN lens being in the direction of radiation dimension.

11. The aperture-constrained radar system according to claim 1, wherein the electronically scanned aperture-constrained phased array is aperture-constrained such that the aperture-constrained dimension is defined by a first number of wavelengths and another dimension, which is not aperture-constrained, is defined by a second number of wavelengths greater than the first number of wavelengths.

12. An aperture-constrained phased array assembly comprising:
an aperture-constrained phased array configured to output electromagnetic (EM) waves; and
a gradient-index (GRIN) lens provided in front of and aligned with the aperture-constrained phased array to output phase-aligned EM waves based on the EM waves output from the aperture-constrained phased array,
wherein the GRIN lens is spaced from the aperture-constrained phased array by a predetermined electrical distance,
wherein the aperture-constrained phased array is aperture-constrained,
wherein the GRIN lens is no more than 10% greater in overall height and width than the aperture-constrained phased array, and
wherein the GRIN lens has a permittivity taper in a first dimension.

13. The aperture-constrained phased array assembly according to claim 12, wherein the permittivity taper is non-linear.

14. The aperture-constrained phased array assembly according to claim 13, wherein the permittivity taper is a multi-extrema permittivity taper.

15. The aperture-constrained phased array assembly according to claim 12, wherein the aperture-constrained phased array is aperture-constrained in the first dimension.

16. The aperture-constrained phased array assembly according to claim 12, wherein the aperture-constrained phased array is aperture-constrained in an x-direction, a y-direction, and/or a z-direction.

17. A gradient-index (GRIN) lens for a radar sensor comprising:
an input surface defined by a body configured to receive and transmit electromagnetic (EM) waves received from an aperture-constrained phased array; and
an output surface defined by the body configured to output phase-aligned EM waves based on the EM waves transmitted from the input side,
wherein the GRIN lens is dimension-constrained in at least one dimension,
wherein the GRIN lens has a first multi-extrema permittivity taper in a first dimension,
wherein the GRIN lens is planar or conformal, and wherein the GRIN lens is comprised of a plurality of unit cells configured to provide the first multi-extrema permittivity taper based on relative configuration of a first material and a second material different from the first material.

18. The gradient-index (GRIN) lens according to claim 17, wherein an electrical thickness of the GRIN lens is less than $\lambda/2$, where $\lambda$ is wavelength of the EM waves received from the aperture-constrained phased array.

19. The gradient-index (GRIN) lens according to claim 17, wherein the GRIN lens has a second multi-extrema permittivity taper in a second dimension different from the first dimension.

20. The gradient-index (GRIN) lens according to claim 17, wherein the GRIN lens is no more than 10% greater in overall height and width than the aperture-constrained phased array.

* * * * *